Dec. 20, 1932.   S. I. LEVY   1,891,717
TREATMENT OF IRON PYRITES
Filed Feb. 25, 1928
Flow Sheet.
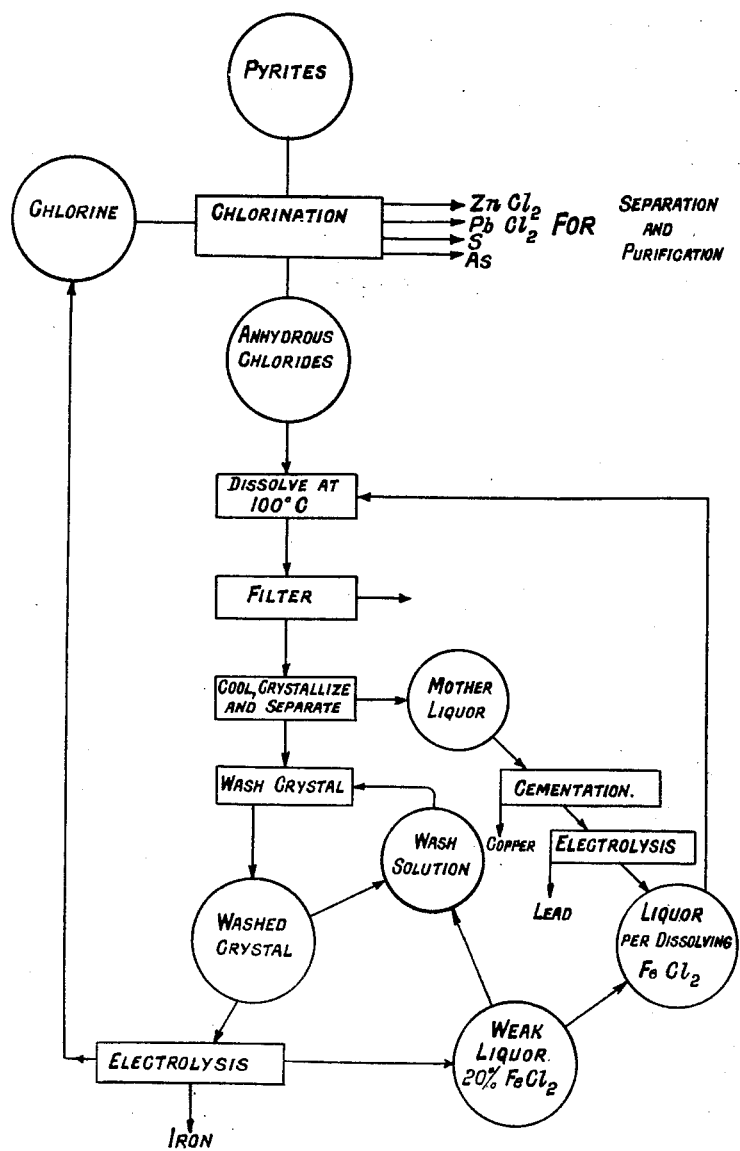

Patented Dec. 20, 1932

1,891,717

UNITED STATES PATENT OFFICE

STANLEY ISAAC LEVY, OF LONDON, ENGLAND, ASSIGNOR TO SULPHIDE CORPORATION, OF NEW YORK, N. Y., A CORPORATION OF DELAWARE

TREATMENT OF IRON PYRITES

Application filed February 25, 1928, Serial No. 257,095, and in Great Britain February 10, 1928.

This invention relates to the treatment of pyrites for the recovery of sulphur and of the metals contained therein.

It is known that sulphide minerals may be completely decomposed by reaction with chlorine gas at temperatures of 500–1000° C. The metals are converted to chlorides, and sulphur is driven off and may be collected. I have found as the result of experimental research that this reaction may be applied to cupreous iron pyrites, and my present invention consists in treating cupreous iron pyrites in such a way that the elements contained in it may readily be separated and recovered without loss of chlorine.

The invention will be understood from the following description and the accompanying flow sheet.

The first stage of the process, consisting in decomposing the pyrites by means of chlorine gas, may be carried out in a continuous furnace, which may be of the mechanically operated or of the rotating or of the stationary type. The reaction proceeds very rapidly and is exothermic, as shown by the equation:

$$FeS_2 + Cl_2 = FeCl_2 + S_2 + 46.5K.$$

The temperature may be maintained at any desired point by regulation of the rate of chlorine supply.

The chlorides of zinc and lead are almost completely volatile under these conditions at temperatures over 700° C. and are driven off together with the sulphur and any arsenic contained in the mineral. By a suitable arrangement of condensers I collect the volatile chlorides separately in the first condensers then the bulk of the sulphur in the liquid condition, in the middle condensers, and in the last receivers the remainder of the sulphur, together with the arsenic, if any. By allowing the liquid sulphur in the middle condensers to settle, and then drawing off the liquid from a point at or below the surface, I may obtain the greater proportion of the sulphur in a practically pure condition. The volatile chlorides in the first condensers may be separated and the metals recovered in known manner.

The iron and copper of the mineral are converted into ferrous and copper chlorides, which collect at the bottom of the furnace, together with small proportions of lead and zinc chlorides, in the molten condition, if the temperature be about 700° C.; these molten chlorides may flow off continuously, or may be tapped off at intervals, as desired. The furnace may thus be worked continuously over very long periods. The small amount of insoluble matter in the mineral gradually accumulates in the furnace, which requires therefore to be stopped and cleared at intervals.

I may carry out this first stage at any temperature between 500° and 1000° C.; 700°–800° C. is a suitable range for obtaining the non-volatile chlorides in the molten condition, and for driving off the volatile zinc and lead chlorides, but I may vary this temperature according to the composition and properties of the mineral.

The liquid ferrous and copper chlorides drawn off from the furnace are treated with sufficient water to form a solution at the ordinary temperature. The heat of hydration of ferrous chloride is considerable, and the solution becomes very hot. It is filtered from any insoluble matter carried out of the furnace, and treated with metallic iron plates, bars, scrap, or other suitable form of iron, for the removal of copper in known manner. The precipitation of copper is completely and easily effected in this way. I may however employ any other method for separation of the copper. The liquor is settled or filtered, and the clear ferrous chloride solution subjected to electrolysis. Any small quantities of lead present are removed by a preliminary treatment at low voltage.

The electrolysis of the ferrous chloride solution is effected at a temperature of 90–100° C. with an E. M. F. of 2.3 to 3 volts, and a current density of 10 to 25 amps. per sq. ft. The cathode may be a thin plate, a mandrel or other suitable object, and may be stationary or may rotate. The anode is a plate, rod or cylinder of carbon or other inert material, immersed in a concentrated solution of a suitable chloride, for example, sodium, calcium, or magnesium or similar chloride, contained in an anode chamber of porous clamp or earthenware, preferably unglazed, or of other suitable porous material. This anode chamber may be suitably moulded from a good china clay, dried slowly, and fired at a low temperature; it has very low resistance, but prevents diffusion between the anode chloride solution and the ferrous chloride solution. I do not wish to restrict myself to any particular form of electrolytic cell. The cell may be divided into anode and cathode chambers by means of a partition of porous clay or other material, the anode chamber being filled with a concentrated solution of sodium, calcium, magnesium or similar chloride, and the cathode chamber with ferrous chloride solution.

A coherent, uniform deposit of pure iron is formed on the cathode. Chlorine is drawn off from the top of the anode chamber in known manner, dried by cooling and/or other suitable means, and conducted to the furnace for treatment of further quantities of pyrites.

The solution is circulated through the cells in known manner until the strength falls to 20% ferrous chloride by weight; beyond this point, the voltage required begins to increase. The mother liquor is used for the solution of a further quantity of the molten chlorides from the furnace; copper is removed from the hot solution as already described, and the liquor returned for electrolysis.

If I desire to ensure that absolutely pure ferrous chloride only is supplied to the electrolytic bath, the anhydrous chlorides tapped off from the furnace may be treated only with sufficient spent liquor or mother liquor or both to form a solution saturated at about 80° C. with respect to ferrous chloride, the temperature being raised to 100° C. The hot liquor is filtered and allowed to cool. Pure ferrous chloride crystals, $FeCl_2, 4H_2O$, separate, and are washed and used for making up the cathode liquor for electrolysis. The mother liquor left after separation of the crystals may be treated as described above for the recovery of copper, and may be then employed, together with the necessary quantity of weak liquor from the electrolytic treatment, for dissolving a further quantity of the anhydrous chlorides; this sequence may be repeated until zinc accumulates in the liquor. The zinc may be allowed to accumulate until it becomes difficult to wash the ferrous chloride crystals free from this element, which may be at a concentration of 100 grams of zinc per litre or more. The liquor is then removed for treatment, and the cycle started afresh. The zinc-rich liquor is treated by concentration or otherwise to cause separation of most of the ferrous chloride, and to recover the zinc. Alternatively I may precipitate copper from the boiling saturated solution by means of metallic iron and afterwards cool the liquor to cause separation of the pure ferrous chloride crystals.

In those instances in which it is undesirable to employ the amount of power necessary for electrolysis, I may separate pure ferrous chloride crystals as already described, and after drying these in a current of warm air or waste furnace gases below 100° C. decompose them into pure ferric oxide and hydrogen chloride by heating in air, with or without steam, at a temperature of 250–300° C. The quantity of air employed for the decomposition is regulated so that the acid gases evolved contain 4 volumes hydrogen chloride to one volume of oxygen. The hot gases are cleansed and passed over a copper chloride or other catalyst in a furnace to effect the conversion of the hydrogen chloride into chlorine; the chlorine may be recovered from the gases and used for treatment of further quantities of pyrites, or the gases may be passed directly without separation of chlorine over a further quantity of pyrites heated in a furnace to 700–900° C. The pyrites is attacked, yielding chlorides of iron, lead and zinc, and sulphur is driven off; some hydrogen chloride and sulphur dioxide may be present in the exit gases. The exit gases are scrubbed to remove hydrogen chloride, and then contain, besides inert gases, only sulphur dioxide, which is caused to react with hydrogen sulphide produced as described below.

The chlorides formed may be caused to flow from the furnace in the molten condition or the mixture of chlorides and insoluble residue may be washed with boiling water; the chlorides in either case are taken into solution. Any copper present in this solution is precipitated by means of iron as already described. The lead is recovered from the solution by electrolysis. Ferrous chloride is separated by cyclic crystallizations, and zinc accumulated in the mother liquor, as already described. The insoluble residue may be returned to the furnace or may be treated with the hydrochloric acid recovered by scrubbing the exit gases. The hydrogen sulphide given off in the treatment of the residue with hydrochloric acid is caused to react with the sulphur dioxide present in the waste gases from the furnace to give pure brimstone in known manner. A final residue rich in copper is obtained, whilst iron and zinc go into solution as chlorides; this chloride solution is added to the chloride solution referred to at the beginning of this paragraph.

I claim.

1. A process of treating pyrites and other sulphide materials which comprises treating the material at temperatures up to 1000° C. with a chlorinating agent substantially free from moisture and hydrogen compounds to drive off and recover the volatile chlorides substantially free from sulphur chlorides and ferric chloride and form a residue containing non-volatile chlorides, separating the ferrous chlorides from the chlorides of non-ferrous metals, electrolyzing for the deposition of iron and the recovery of chlorine, and treating further quantities of sulphide material by means of such chlorine.

2. A process of treating pyrites and other sulphide materials which comprises treating the material at temperatures up to 1000° C. with a chlorinating agent substantially free from moisture and hydrogen compounds to drive off and recover the volatile chlorides substantially free from sulphur chlorides and ferric chloride and form a residue containing non-volatile chlorides, dissolving the said non-volatile chlorides in water to form a concentrated solution, removing the copper by precipitation, electrolyzing the ferrous chloride solution at a low E. M. F. with an iron anode for the removal of lead, electrolyzing for the removal of iron and liberation of chlorine, and treating further quantities of sulphide material by means of such chlorine.

3. A process of treating pyrites and other sulphide materials, which comprises treating the material at temperatures up to 1,000° C. with a chlorinating agent substantially free from moisture and hydrogen compounds to drive off and recover the volatile chlorides substantially free from sulphur chlorides and ferric chloride and form a residue containing non-volatile chlorides, dissolving the non-volatile chlorides in the minimum quantity of water to form a concentrated hot solution, separating copper from such solution by precipitation with pure iron, and the lead therefrom by electrolyzing with an iron anode, dissolving and electrolyzing the ferrous chloride for the deposition of iron and the recovery of chlorine, and treating further quantities of sulphide material by means of such chlorine.

4. A process of treating pyrites and other sulphide materials which comprises treating the material at temperatures up to 1,000° C. with a chlorinating agent substantially free from moisture and hydrogen compounds to drive off and recover the volatile chlorides substantially free from sulphur chlorides and ferric chloride, condensing by fractional condensation the volatile chlorides so driven off in separate receivers and condensing the bulk of the sulphur in the liquid condition in other receivers for the recovery therefrom of pure brimstone, separating pure ferrous chloride from the non-volatile chlorides, and electrolyzing the ferrous chloride for the recovery of chlorine and preparation of pure iron.

5. A process of treating pyrites and other sulphide materials, which comprises treating the material at temperatures up to 1000° C. with a chlorinating agent substantially free from moisture and hydrogen compounds to drive off the volatile chlorides substantially free from sulphur chlorides and ferric chloride, and form a residue containing non-volatile chlorides, dissolving the non-volatile chlorides in the minimum quantity of water to form a concentrated hot solution, cooling the solution and separating pure ferrous chloride, treating the mother liquor to separate copper, and electrolyzing the separated ferrous chloride to deposit iron and recover chlorine.

6. A process of treating pyrites and other sulphide materials, which comprises treating the material at temperatures up to 1,000° C. with a chlorinating agent substantially free from moisture and hydrogen compounds to drive off and recover the volatile chlorides substantially free from sulphur chlorides and ferric chloride and form a residue containing non-volatile chlorides, dissolving the non-volatile chlorides in the minimum quantity of water to form a concentrated hot solution, cooling the solution and separating pure ferrous chloride, treating the cold solution to separate copper, and using the mother liquor to dissolve a further quantity of anhydrous chlorides.

7. A process of treating pyrites and other sulphide materials, which comprises treating the material at temperatures up to 1,000° C. with a chlorinating agent to drive off and recover the volatile elements and form a residue containing non-volatile chlorides, dissolving the non-volatile chlorides in the minimum quantity of water to form a concentrated hot solution, cooling the solution and separating pure ferrous chloride, treating the cold solution to separate copper, using the mother liquid to dissolve a further quantity of anhydrous chlorides at a high temperature, cooling and separating pure ferrous chloride, repeating in order to concentrate zinc in the mother liquor, and removing the eventually zinc-rich liquor from the cycle for recovery of zinc.

8. A process of treating pyrites and other sulphide materials, which comprises treating the material at temperatures up to 1,000° C. with a chlorinating agent to drive off and recover the volatile elements and form a residue containing non-volatile chlorides, dissolving the non-volatile chlorides in the minimum quantity of water to form a concentrated hot solution, cooling the solution and separating ferrous chloride crystals, dissolving and electrolyzing the pure ferrous chloride crystals at a temperature of 90–100° C. until the ferrous chloride content is reduced to 20% for the removal of iron and formation of chlorine, treating further quantities of sulphide material by means of such chlorine, producing again pure ferrous chloride crystals by the same sequence, and dissolving this pure ferrous chloride in the 20% solution from the electrolysis.

9. A process of treating pyrites and other sulphide materials, which comprises treating the material at temperatures up to 1,000° C. with a chlorinating agent to drive off and recover the volatile elements and form a residue containing non-volatile chlorides, dissolving the non-volatile chlorides in the minimum quantity of water to form a concentrated hot solution, cooling the solution and separating pure ferrous chloride crystals, dissolving and electrolyzing the pure ferrous chloride at a temperature of 90–100° C. until the ferrous chloride content is reduced to 20%, using part of this spent liquor to dissolve pure ferrous chloride crystals for further electrolysis, and adding the remainder to the mother liquor in treating the anhydrous chlorides.

10. A process of treating pyrites and other sulphide materials, which comprises treating the material at temperatures up to 1,000° C. with a chlorinating agent substantially free from moisture and hydrogen compounds to drive off and recover the volatile chlorides substantially free from sulphur chlorides and ferric chloride and form a residue containing non-volatile chlorides, dissolving the non-volatile chlorides in the minimum quantity of water to form a concentrated hot solution, cooling the solution and separating pure ferrous chloride, treating the mother liquor to separate copper and lead and electrolyzing the separated ferrous chloride to deposit iron and recover chlorine.

11. A process of treating pyrites and other sulphide materials, which comprises treating the materials at temperatures up to 1,000° C. with a chlorinating agent to drive off and recover the volatile elements and form a residue containing non-volatile chlorides, dissolving the non-volatile chlorides in the minimum quantity of water to form a concentrated hot solution, cooling the solution and separating pure ferrous chloride, treating the cold solution to separate copper and lead, using the mother liquor to dissolve a further quantity of anhydrous chlorides at a high temperature, cooling and separating pure ferrous chloride, repeating in order to concentrate zinc in the mother liquor, and removing the eventually zinc-rich liquor from the cycle for recovery of zinc.

12. A process of treating pyrites and other sulphide materials, which comprises treating the material at temperatures up to 1,000° C. with a chlorinating agent substantially free from moisture and hydrogen compounds to drive off and recover the volatile chloride substantially free from sulphur chlorides and ferric chloride and form a residue containing non-volatile chlorides, dissolving the said non-volatile chlorides in water to form a solution, electrolyzing the solution for the removal of iron and liberation of chlorine, and treating further quantities of sulphide material by means of such chlorine.

In testimony whereof I have signed my name to this specification.

STANLEY ISAAC LEVY.